Patented Oct. 27, 1925.

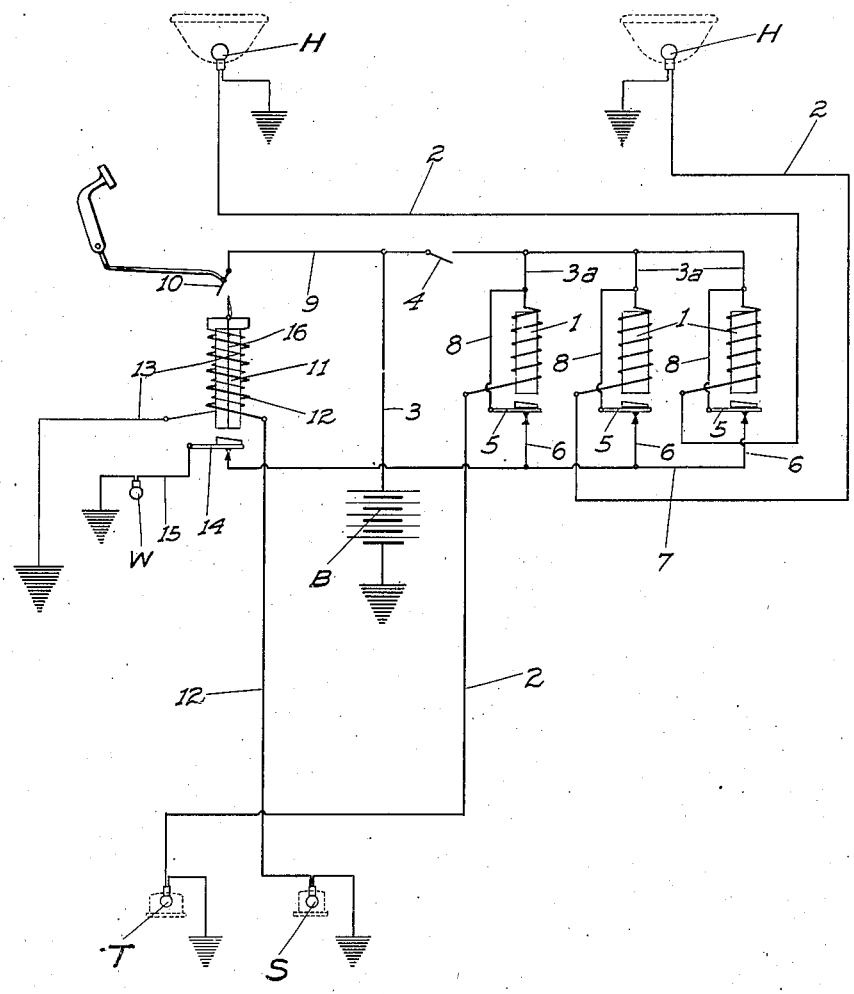

1,558,949

UNITED STATES PATENT OFFICE.

FRANK J. THOMPSON AND GEORGE V. ARANO, OF MODESTO, CALIFORNIA; SAID ARANO ASSIGNOR TO SAID THOMPSON.

DEFECTIVE-LIGHT INDICATOR.

Application filed February 11, 1924. Serial No. 692,058.

*To all whom it may concern:*

Be it known that we, FRANK J. THOMPSON and GEORGE V. ARANO, citizens of the United States, residing at Modesto, county of Stanislaus, State of California, have invented certain new and useful Improvements in Defective-Light Indicators; and we do declare the following to be a full, clear, and exact description of the same, reference being had to the accompanying drawings, and to the characters of reference marked thereon, which form a part of this application.

This invention relates to improvements in defective light indicating means, particularly in connection with automobile lights, the principal object of our invention being to provide an arrangement whereby the driver of the car, without leaving his seat, will be instantly advised that one light or the other is not functioning, presuming of course that the light-circuit switch is closed.

We have also arranged our device so that a single signal or indicating light may be used not only for all the running lights, but also for the stop or turn signal lights as well, which are on a different circuit, and have a separate switch, from the running lights.

Our entire apparatus may be arranged in a very compact form, so as to occupy but little space on the car and hence it may be readily located out of sight behind the dashboard under the engine hood, or other suitable location. Also the installation of our device may be made without removing or disturbing in any way the usual light and other switches, it being only necessary to make certain changes, in the hook-up of the different circuit wires, which can be very easily done.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

The figure on the drawing is a wiring diagram showing our improved indicating means installed in connection with the standard light equipment of an automobile, all circuits being shown open.

Referring now more particularly to the characters of reference on the drawings, H denotes the headlight, T the tail light, and S the stop or turn-signal light of the car, energy for all such lights being derived from the usual storage battery B.

The tail and headlights together may be called the running lights, and for each such light we provide a common coil magnet 1, interposed and connected in the circuit between the battery and lights. In other words, the leads 2 from the lights are connected to one end of the respective coils, while the lead 3 from the battery is connected to the other ends of the coils by means of branch leads 3ª. The usual hand-operated switch 4 is interposed in the lead 3 ahead of all the leads 3ª.

This arrangement, as will be evident is such that the current may flow through any coil regardless of whether the circuit through another coil is interrupted. As is customary in automobile practice, the one-wire circuits are used, the lights and battery being grounded on the frame of the car, which serves as the return lead. Therefore if the switch 4 is closed, and all the lights are in working order, the circuit will be closed through all the coils and the magnetic cores of the latter will be energized.

If, however, any one light has burned out or is otherwise defective, the circuit cannot be completed through the corresponding coil, and the core of the latter will not be energized.

Positioned to be attracted by the different magnets are individual armatures 5, which when the coil circuits are broken are held away from said magnets by gravity or otherwise, and then make contact with leads 6 connected in common to a lead 7. The armatures are themselves connected to the leads 3ª by leads 8 bypassed around the coils.

We have shown our system or apparatus however in connection with the stop light S whose lead 9 from the battery has an intermittently and automatically operated switch 10, this switch being normally open but closed as usual upon the application of the foot brake of the car.

In connection with the stop-light circuit we employ a shunt-wound coil-magnet 11 of well known character and function, the coarse winding 12 of which is connected to the lead 9 and extends directly to the light S, while the fine winding 13 though connected to the lead 9 is grounded beyond the coil. The coil-magnet 11 is of that type in which the windings 12 and 13 are reversely disposed relative to each other on the magnet or core. This arrangement causes the magnet, when the current flows through both windings simultaneously, to remain deenergized, since the magnetizing influence of one winding counteracts that of the other. When however a current flows through only one of the coil windings, the magnet becomes energized. The armature 14 of this shunt-coil is connected to the light W by a lead 15, and when not attracted by the magnet 11 forms a switch closing the circuit to the light W through leads 7 and 15. When the armature 14 is attracted by said magnet (which will be when the light S is defective and the circuit through the coarse winding 12 cannot be closed) a circuit is closed to light W from lead 9 directly to said armature through a lead 16, and thence to light W through lead 15.

To recapitulate, if the running lights are in good order, the circuits from the battery to the lights will be completed through the magnets, energizing the latter and breaking the circuit to the warning or indicator light W, which will not of course be lit.

Should any running light fail, the corresponding circuit cannot be completed, the magnet in said circuit will not be energized and the armature thereof will consequently drop and close the circuit to the light W, which will thus be lit, and will remain lit until the defective light is replaced or the switch 4 is opened, since this switch controls both the operation of the running lights and of the warning light W as far as its connection with said running lights is concerned.

As to the stop light S, if this is in working order the circuit from the battery thereto will be completed when switch 10 is closed through leads 3, 9 and 12, without causing energizing of the magnet and consequently without breaking the circuit between the leads 7 and 15 of the warning light W, permitting the latter to function by reason of any defective running light.

If the stop light is defective, the current cannot pass through lead 12, but will still flow through winding 13, energizing the magnet and causing the armature 14 to be raised to close a circuit to the light W from the battery through leads 3, 9, and 16, the armature 14, and lead 15.

The switch 10 being only closed when the break pedal of the car is depressed, the light W will then only be lit as long as said pedal is applied. Thus a distinction in the operation of the warning light for the running and stop lights is had, since when functioning in connection with the running lights, said warning light will glow continuously while when functioning in connection with the stop light, flashes of short duration, or for as long as the brake is applied, will be had.

It is necessary that the circuit from the light W to the armatures 5 be broken when the circuit to the said light is closed through the armature 14, since otherwise the current could also flow through the leads to the running lights even when the switch 4 was open. This would cause an undesired and unnecessasry flashing of said running lights in addition to the flashing of the actual warning light W.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. A warning signal device for defective lights comprising in combination with separate lights arranged in independent circuits, a common source of current for said circuits, independent switches for the circuits, a common electric signal member for both light circuits, a circuit for said signal member one side of which is connected to the source of current and the other side is adapted to be connected to either light circuit alternately, means in one circuit for causing the signal circuit to be closed only when the corresponding switch is closed but the circuit thereof remains broken adjacent its light, a magnet interposed in the other light circuit, means whereby said magnet will be energized only if the corresponding light circuit remains broken adjacent its light with the switch thereof closed, an armature for said magnet interposed in the signal circuit, and means whereby when the magnet is deenergized said armature forms a connection between two sections of the signal circuit one of which is connected to the means in the first named circuit; and when the magnet is energized and the armature is drawn thereto, a connection between the signal member and the last named light circuit will be made.

2. A warning signal device for defective lights comprising in combination with separate lights arranged in independent circuits, a common source of current for said circuits, independent switches for the circuits, a common electric signal member for both light circuits, a circuit for said signal member one side of which is connected to the source of current and the other side is adapted to be connected to either light circuit alternately, means in one circuit for causing the signal circuit to be closed only when the corresponding switch is closed but the circuit thereof remains broken adjacent its light, a magnet interposed in the other light circuit, means whereby said magnet will be energized only if the corresponding light circuit remains broken adjacent its light with the switch thereof closed, an armature for said magnet interposed in the signal circuit, normally forming a connection between the signal member and the means in the first named circuit as long as the magnet is deenergized, and a lead from the last named light circuit with which the armature engages when the magnet is energized and the first named connection made by said armature is broken.

3. A warning signal device for defective lights comprising in combination with separate lights arranged in independent circuits, a common source of current for said circuits, independent switches for the circuits, a common electric signal member for both light circuits, a circuit for said signal member one side of which is connected to the source of current and the other side is adapted to be connected to either light circuit alternately, means in one circuit for causing the signal circuit to be closed only when the corresponding switch is closed but the circuit thereof remains broken adjacent its light, a magnet interposed in the other light circuit, and about which one wire of said circuit is wound, a shunt circuit wire wound about the magnet reversely to the first winding and connected to said first wire ahead of the magnet, both said windings receiving current when the light circuit is unbroken at the light and the corresponding switch is closed and only the shunt winding receiving current when the light circuit is open adjacent the light whereby the magnet will then be energized; an armature for said magnet normally forming a connection between the signal member and the means in the first named circuit as long as the magnet is deenergized, and a lead from the last named light circuit with which the armature engages when the magnet is energized and the first named connection made by said armature is broken.

In testimony whereof we affix our signatures.

FRANK J. THOMPSON.
GEORGE V. ARAÑO.